United States Patent [19]

Schy

[11] 3,763,764
[45] Oct. 9, 1973

[54] TACO COOKING APPARATUS

[76] Inventor: Frank R. Schy, 1659 Borden Ave., San Mateo, Calif. 94403

[22] Filed: Nov. 17, 1971

[21] Appl. No.: 199,562

[52] U.S. Cl................ 99/353, 99/404, 99/427, 198/82
[51] Int. Cl. ............................................ A47j 37/12
[58] Field of Search................. 99/353, 404, 405, 99/406, 407, 427, 443 C; 198/82, 83, 84

[56] References Cited
UNITED STATES PATENTS

| | | | |
|---|---|---|---|
| 3,520,248 | 7/1970 | MacKendrick | 99/404 X |
| 3,680,474 | 8/1972 | Brown | 99/353 |
| 2,577,925 | 12/1951 | Sternbach | 99/450.2 |
| 3,267,836 | 8/1966 | Yepis | 99/353 |
| 2,603,143 | 7/1952 | Saenz | 99/404 X |

Primary Examiner—Harvey C. Hornsby
Assistant Examiner—Alan I. Cantor
Attorney—Thomas E. Schatzel and Claude A. S. Hamrick

[57] ABSTRACT

An improved taco shell cooking apparatus including a cooking means, at least one forming device, and a conveyor for moving a sheet of comestible material past the cooking means and thence to a packaging station. The forming device may include, or be integral with, an articulated endless conveyor belt and/or one or more fixed bodies having surfaces across which the material is transported in order to form it into the desired configuration as it is cooked.

8 Claims, 16 Drawing Figures

PATENTED OCT 9 1973 3,763,764
SHEET 1 OF 4
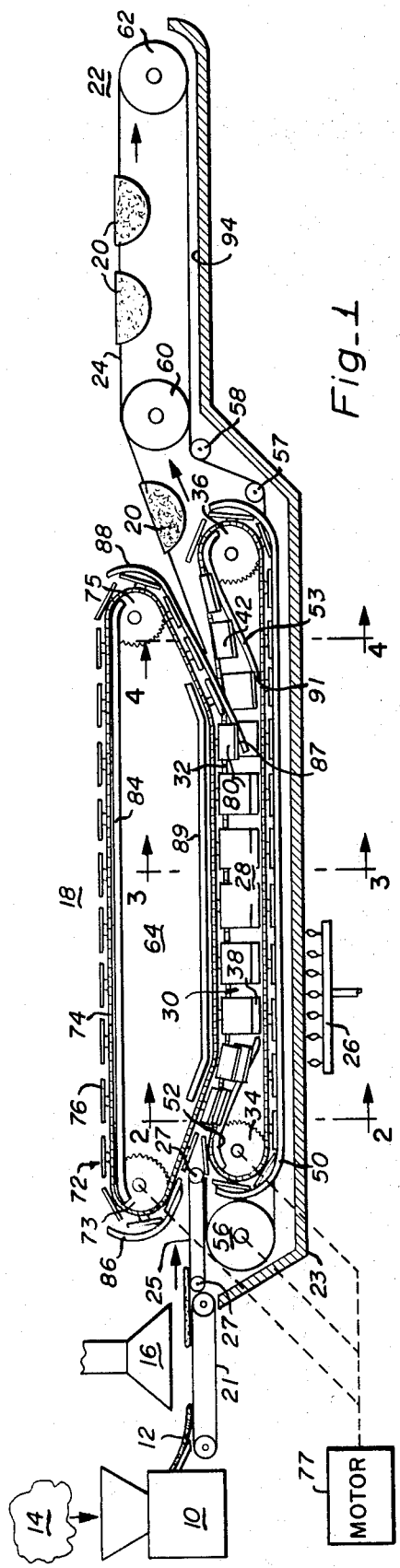
Fig_1
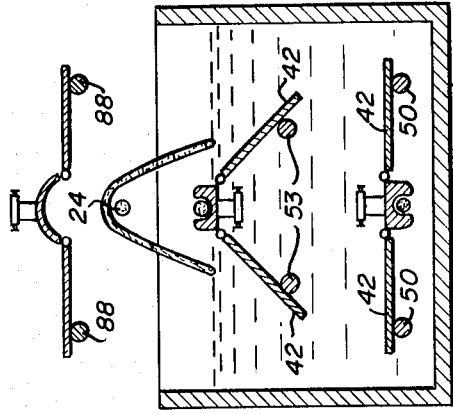
Fig_4
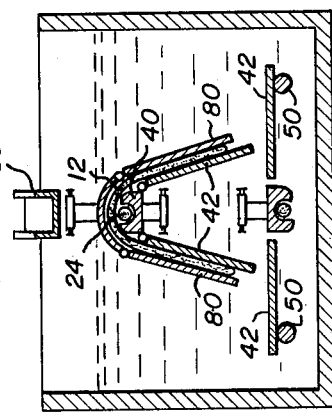
Fig_3
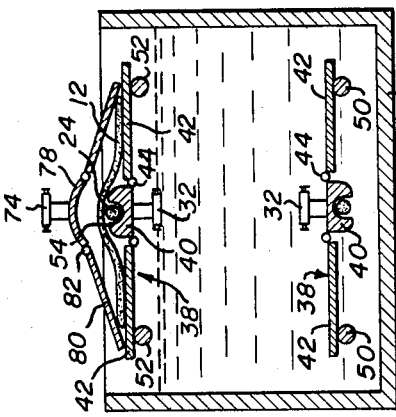
Fig_2

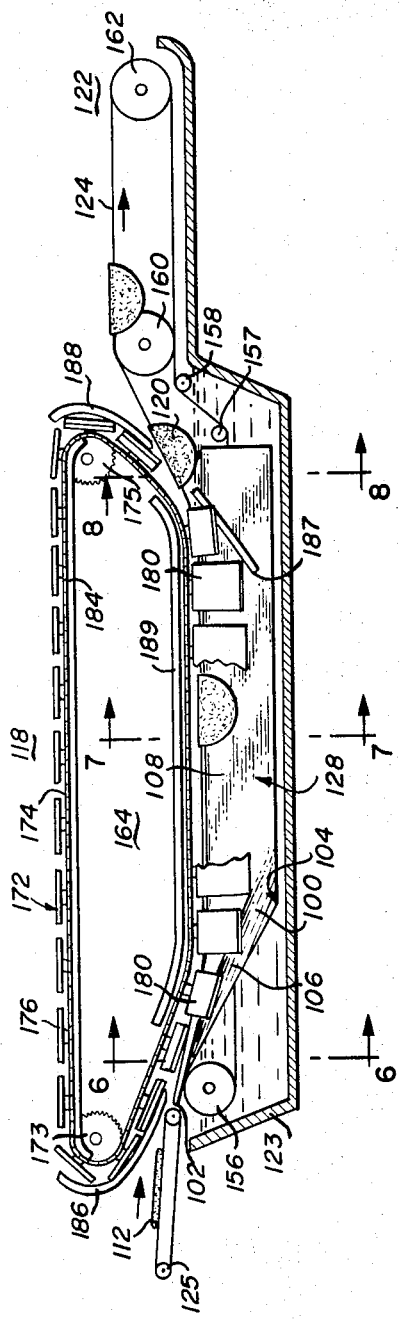
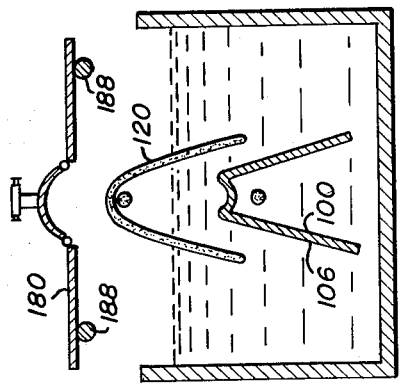
Fig_8
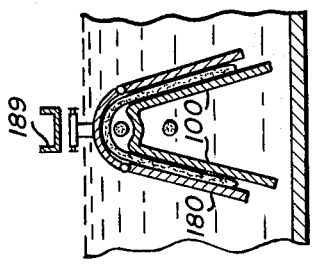
Fig_7
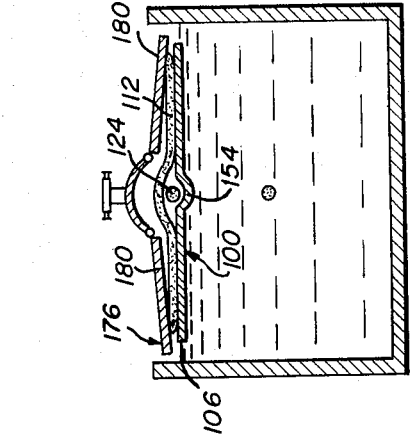
Fig_6
Fig_5

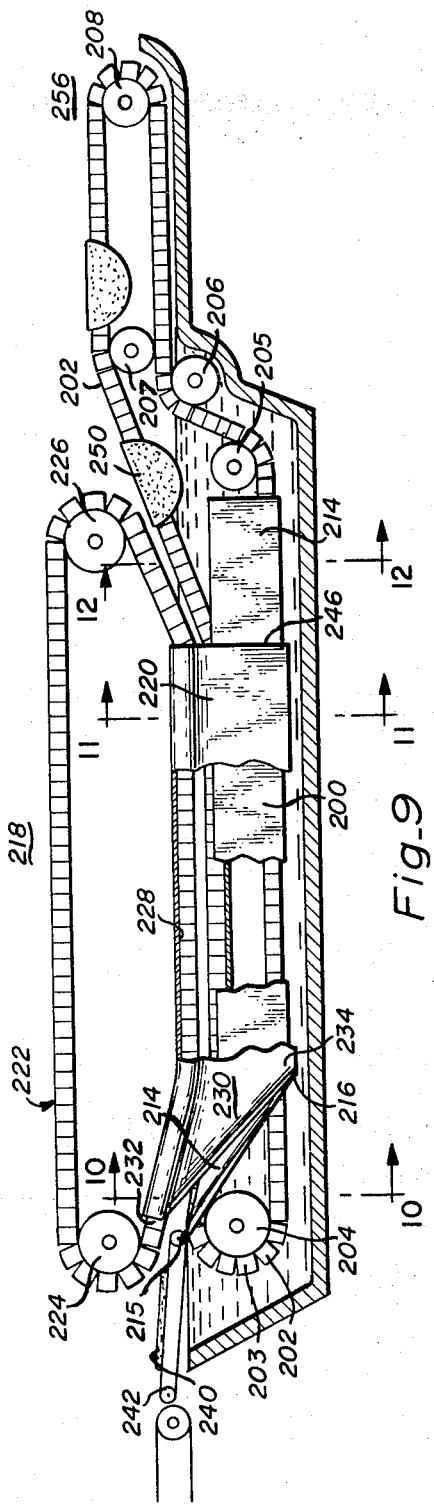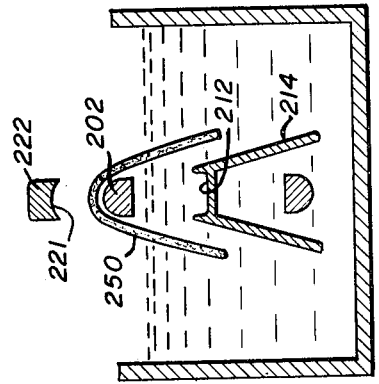
Fig.9
Fig.10
Fig.11
Fig.12

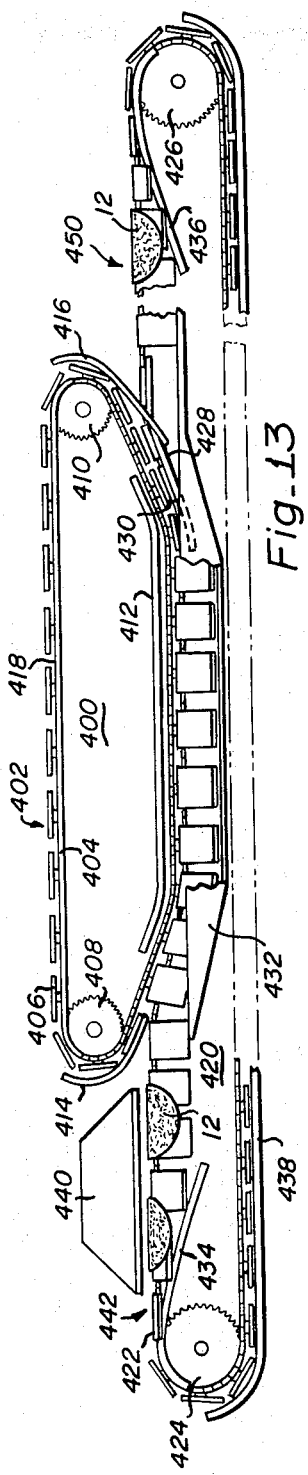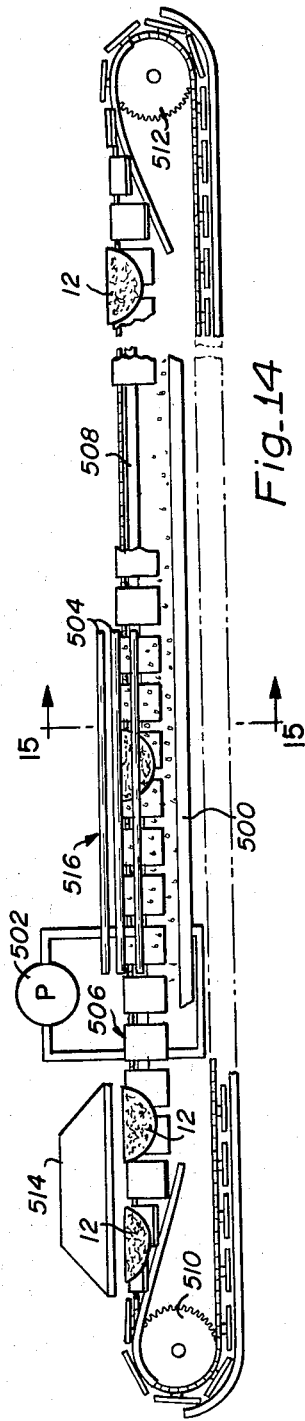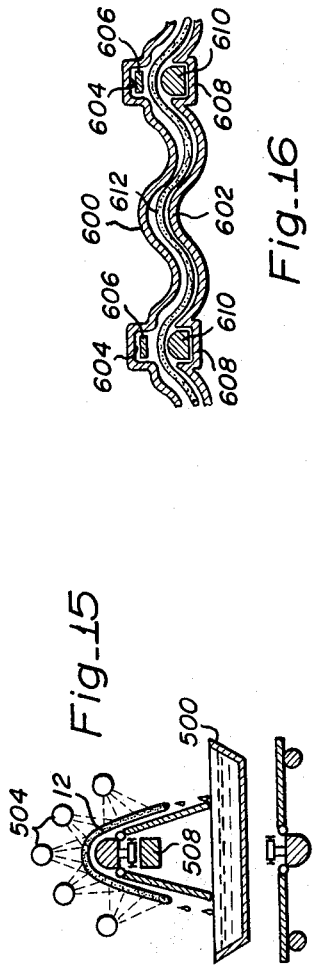

TACO COOKING APPARATUS

BACKGROUND OF THE INVENTION

1. Field of the Invention

The present invention relates generally to food preparation apparatus and more particularly to an improved apparatus for simultaneously forming and cooking taco shells.

2. Background of the Invention

Taco shell cooking apparatus of various types have been known and used for many years, among which are those devices disclosed in the U.S. Pat. Nos. to Schy, 3,570,393; Yepis, 3,267,836; Ford, 2,967,474; and Saenz, 2,603,143. Each of the devices disclosed in the above patents relates to a means for forming and cooking a raw or partially cooked tortilla into a form which may be utilized in the preparation of tacos or similar food products. With the exception of the Schy apparatus, each of these prior art devices suffers from the disadvantage that it either requires individual loading of each tortilla or it does not adequately protect the tortilla and/or resulting taco shell against damage either during or after the cooking operation.

The Schy apparatus described in the aforementioned patent, which is hereby incorporated by reference into this disclosure, overcomes most of the prior art problems and permits the delicate tortilla and resulting taco shell to be carefully handled while at the same time providing for a very high production rate. In accordance with the present invention, certain novel modifications have been made to the Schy apparatus which substantially improve its comestible material handling capabilities and simplify its construction.

OBJECTS OF THE PRESENT INVENTION

It is therefore an object of the present invention to provide an improved food preparation apparatus for simultaneously forming and cooking comestible material and then discharging the resulting product without damage.

Another object of the present invention is to provide an improved taco shell preparation apparatus which enables raw or precooked tortillas to be simultaneously cooked and formed to a relative high rate to provide taco shells.

Still another object of the present invention is to provide a taco shell preparation apparatus having improved means of transporting the tortilla through cooking and forming means, and then transporting the resulting taco shell to a packaging station.

Briefly, a preferred embodiment of the present invention includes a cooking means, an upper forming means, a lower forming means, and conveying means for moving a sheet of comestible material past the cooking means and the respective forming means and thence to a packaging station. The forming means may constitute a deformable part of the conveying means or may take the form of one or more fixed forming devices having surfaces across which the material is transported by the conveying means so that it is deformed into the desired configuration as it is cooked.

One of the primary advantages of the present invention is that since at least part of the conveying means is in intimate contact with the material during the entire cooking and forming operation, passage through the cooking and forming apparatus and to the packaging station is continuous and uninterrupted.

Another advantage of the present invention is that the new conveying means gently removes the brittle cooked taco shell from the forming means while transporting it toward a packaging station.

Other objects and advantages of the present invention will no doubt become apparent to those of ordinary skill in the art after having read the following detailed description of the preferred embodiments which are illustrated in the several figures of the drawing.

IN THE DRAWING

FIG. 1 is a diagramatic side view of food preparation apparatus in accordance with the present invention.

FIGS. 2–4 are partial transverse sections taken through the embodiment illustrated in FIG. 1.

FIG. 5 is a diagramatic side view illustrating an alternative embodiment of food preparation apparatus in accordance with the present invention.

FIGS. 6–8 are partial transverse sections taken through the embodiment illustrated in FIG. 5.

FIG. 9 is a diagramatic side view illustrating still another alternative embodiment of food preparation apparatus in accordance with the present invention.

FIGS. 10–12 are transverse sections taken through the embodiment illustrated in FIG. 9.

FIG. 13 is a diagrammatic side view of still another alternative embodiment of food preparation apparatus in accordance with the present invention.

FIG. 14 is a diagrammatic side view of still another alternative embodiment of food preparation apparatus in accordance with the present invention.

FIG. 15 is a transverse section taken through the embodiment illustrated in FIG. 14.

FIG. 16 is a transverse section illustrating an alternative configuration of forming means in accordance with the present invention.

DETAILED DESCRIPTION OF THE PREFERRED EMBODIMENTS

Referring now to FIG. 1 of the drawing, a taco shell manufacturing system in accordance with the present invention is illustrated. Although the present invention is primarily described with reference to taco shell making embodiments, it is to be understood that the apparatus is also applicable for use in other heat forming applications and no intention to limit the invention to taco shell making systems is to be inferred. The illustrated system includes a rolling and cutting machine 10 for preparing round tortillas 12 form a batch of tortilla dough 14, a preheater 16 for slightly precooking the tortillas 12, and a forming and cooking apparatus 18 for converting the precooked tortillas 12 into fully cooked and shaped taco shells 20. In this embodiment, once the raw tortilla dough 12 is fed into the system no further manual operation is required except possibly to remove the formed and cooked taco shells at station 22 for packaging, and even this step could easily be automated.

The preheater 16 includes infrared or other suitable heating elements for temporarily raising the temperature of the tortillas 12 as they are carried therebeneath on a conveyor belt 21. Although the preheating or precooking operation is not absolutely required, it is preferred since it increases the structural integrity of the tortilla. After being precooked, the tortillas 12 are then fed by a second conveyor belt 25 into the cooking and forming apparatus 18 which simultaneously cooks and shapes them into the folded taco shell configuration shown at 20. The prepared taco shells 20 are transported out of the cooking apparatus to the packaging 22 by a conveyor in the form of a narrow, endless belt or cable 24 which passes through apparatus 18 as will be described in detail below.

The apparatus 18 includes a tank 23 filled with a cooking oil which is raised to and maintained at a suitable cooking temperature using conventional heating means such as the gas fired element shown at 26. As a possible alternative to the heated oil cooking bath it is envisioned that a microwave oven might also be used to cook the tortillas as they are formed. Disposed within tank 23 is a lower forming means 28 which, as illustrated, may be embodied as a deformable web or conveyor 30. Conveyor 30 includes a belt or chain 32 suspended from a pair of sprockets 34 and 36 which are disposed at each end of tank 23. Affixed to chain 32 are a plurality of articulated conveyor segments 38 which, as further illustrated in the cross-sections shown in FIGS. 2-4, include a center member 40 affixed to and carried by chain 32. A pair of wing-like extensions, or flaps, 42, are hingedly attached to each member 40 by means of suitable hinging means 44, and are adapted to rotate into the U-shaped configuration shown in FIG. 3.

Disposed within tank 23 and along each side of conveyor 30 are a pair of guide members 50 which support the outer edges of flaps 42 causing them to be disposed horizontally as they are returned along the bottom of tank 23 from sprocket 36 to sprocket 34. A set of guide members 52 are positioned on each side of sprocket 34 and serve to guide flaps 42 in transition from the generally flat or planar configuration illustrated in FIG. 2 to the generally U-shaped taco shell forming configuration illustrated in FIG. 3.

A second set of guide members 53 are disposed at the other end of tank 23. The ends 55 of guide members 53 engage flaps 42 on their undersides and cause the flaps to rotate back into a planar configuration as they pass over the top of sprocket 36. Note in FIGS. 2-4 that the center member 40 of each of the articulated segments 38 is provided with a longitudinal recess or slot 54, for receiving the cable 24. Cable 24, which may take the form of the round section cable illustrated or may be embodied as a flat or otherwise configured belt, is strung across pulleys 56, 57, 58, 60 and 62. Pulley 56 is positioned relative to conveyor 30 in such a manner as to insure that cable 24 is aligned with the slots 54 as each conveyor segment 38 passes over the top of sprocket 34. Pulley 57 serves a similar purpose at the opposite end of the lower forming means 28.

Disposed above the lower forming means 28 is an upper web or conveyor 72 comprised of a belt or chain 74 and articulated segments 76 which are similar to the articulated segments 38 of the lower conveyor means 30. As may be noted from the cross sections illustrated in FIGS. 2-4, the center members 78 of the articulated segments 76 are formed concave in the transverse direction so as to conform to the more or less rounded configuration formed by the composite of the member 40 and cable 22. Segments 76 also include wing-like flaps 80 which are hinged at 82 to rotate toward the outside of the upper conveyor loop rather than toward the inside as in the case of the lower conveyor 28. A pair of flap supporting guides 84 are positioned along each side of the path taken by conveyor 72 as it passes over the top of sprocket 75 for return toward sprocket 73. Guides 84 maintain flaps 80 in a horizontal disposition as they are returned along the top side of the loop. A pair of guides 86 and 88 are provided at each end of upper conveyor 72 and serve to maintain flaps 80 in a planar configuration as they pass around sprocket 73 and then allow them to drop into engagement with a tortilla 12 carried by lower conveyor 30 at some point near the top of sprocket 34. A chain rail 89 is positioned as shown in FIGS. 1 and 3 and serves to guide the upper conveyor 72 into position above lower conveyor 30. As the segments 76 proceed rightwardly, flaps 80 engage the ends 87 of guides 88 and are caused to rotate back to a planar configuration as segments 76 are lifted out of engagement with the now cooked and formed tacos 20. Chain 74 is operatively supported by and driven by a pair of sprockets 73 and 75. The pulley 56 and sprockets 34 and 73 in the preferred embodiment are driven by a common source of power such as the motor 77 so as to cause the upper and lower conveyors as well as cable 24 to move at the same speed.

In operation, the tortilla dough 14 is inserted into machine 10 which rolls out and cuts thin round tortillas 12 which are discharged onto the conveyor belt 21. Conveyor belt 21 carries the tortillas 12 under the preheater 16 and then onto a second conveyor belt 25 which is preferably made of a thin wire mesh capable of rolling about a pair of very small axis rollers 27, or even rolled edges of a flat plate. Because of its flatness, conveyor 25 can be extended over the top of sprocket 34 without requiring that the angle of convergence between the upper conveyor 72 and the lower conveyor 30 be excessive. As the tortillas 12 are fed toward the apparatus 18 on belt 25, the flaps 80 of segments 76 are allowed to drop into engagement therewith, slightly before the tortilla is deposited onto the horizontally disposed segments 38.

At this point, the tortilla 12, upper conveyor segments 76 and lower conveyor segments 38 are relatively positioned as indicated in the cross section shown in FIG. 2. As the upper and lower conveyor segments engage the tortilla 12 and transport it rightwardly, as indicated in FIG. 1, the guides 52 allow the flaps 42 to rotate downwardly with flaps 80 following and serving to shape tortilla 12 into the more or less U-shaped configuration illustrated in FIG. 3. Shortly after passing over the top of sprocket 34, the upper and lower conveyor segments with the tortilla sandwiched therebetween, are submerged in the cooking oil and cooking of the tortilla 12 begins.

Upon reaching the end 87 of the guides 88, flaps 80 are lifted off of the tortilla and at approximately the same time, upper conveyor 72 is deflected upwardly as it reaches the end of the guide 89. At the same time, cable 24 begins to lift out of the slots 54 in the conveyor segments 38 thereby lifting the cooked and formed taco shell 20 out of engagement with the lower conveyor 30. Shortly thereafter, flaps 42 engage the end 91 of guides 53 and begin to transition back into a horizontal disposition so that they may be passed over the top of sprocket 36. The removal of taco shell 20 and the transition of flaps 42 are additionally illustrated in the cross-section shown in FIG. 4. Cable 24 then continues to transport taco shells 20 upwardly out of the cooking bath and over the pulley 60 toward a discharge or packaging station at 22. A certain amount of slack is maintained in cable 24 so that the shells 20 are not cracked as cable 24 begins to lift off the conveyor 30.

Note that the entire operation is entirely mechanical once the tortilla dough 14 has been inserted into machine 10 and the cooking and forming operation proceeds at a constant and uninterrupted rate. Note also that since cable 24 is in engagement with the tortilla and resulting taco shell during the entire transit through apparatus 18 the removal of the taco shell therefrom is continuous. The speed at which the comestible material is passed through the system is controlled primarily by the length of emersion in the cooking oil and the temperature of the oil. In other words, for a given emersion length the speed of the conveyors, and thus the number of taco shells which can be produced in a particular unit of time is a function of the temperature of the cooking bath.

Where it is desirable that the production speed be multiplied, a number of systems such as those described above can be placed in parallel to share a single cooking bath. For example, a prototype having four upper and lower conveyor units has been built and is capable of producing upwards of 200 dozen taco shells per hour.

Most of the oil carried by cable 24 and taco shells 20 drips away before the end of tank 23 is cleared and the additional spacing between pulleys 60 and 62 allows almost complete drying of shells 20 to be accomplished. Any oil which is carried beyond pulley 60 is collected by a drain surface 94 and returned to tank 24. In order to enable re-use of the cooking oil, a filtration system, not shown, is used to filter the oil during periods when the apparatus is not in use.

Turning now to FIG. 5 of the drawing, a modified embodiment 118 of the forming and cooking apparatus 18 previously shown in FIG. 1 is illustrated. In this embodiment the lower forming means 128 has been simplified into the form of a fixed forming body 100 which is transitionally deformed from a horizontal generally planar configuration at the end 102 to a more or less U-shaped configuration at 104 and then throughout the remainder of its length. The upper surface 106 of forming body 100 should be smooth but may be provided with longitudinally disposed grooves 108 which extend along the length thereof and which serve to provide constant lubrication between the tortilla 112 and surface 106 to prevent tortilla 112 from sticking thereto. Forming body 100 may alternatively be perforated to provide lubrication.

As in the previous embodiment, the upper forming means 164 includes an upper conveyor 172 comprised of a belt or chain 174 having articulated segments 176 affixed thereto. Chain 174 is operatively supported by a pair of sprockets 173 and 175. As in the previous embodiment, guides 184, 186 and 188 are provided for controlling the positioning of the flaps 180 of the various segments 176, and a chain rail 189 controls the positioning of conveyor 172 relative to body 100. Forming body 100 is provided with a continuous recess or slot 154 (see FIGS. 6–8) for receiving the cable 124 which is strung across the pulleys 156, 157, 158, 160 and 162.

In operation, the tortilla 112 is deposited onto conveyor belt 125 and carried rightwardly into apparatus 118. As it approaches the top of pulley 156 it is engaged from the top by the flaps 180 of upper conveyor segments 176 and is thence deposited onto lower forming body 100 and cable 124. In some circumstances it may be suitable to provide a continuous lubrication of surface 106 at the end 102 and this can be easily accomplished by a small pumping means (not shown). As tortilla 112 is engaged by flaps 180 on its upper side and cable 124 on its lower side, it is carried rightwardly along surface 106 and thereby deformed into the generally U-shaped configuration illustrated in FIG. 7 as it passes through the cooking oil in tank 123. As segments 176 approach the end of chain rail 189, flaps 180 engage the ends 187 of guide means 188 and are lifted upwardly out of engagement with the now formed and cooked taco shell 120. Shortly thereafter, cable 124 lifts out of the slot 154 carrying taco shells 120 upwardly with it, as illustrated in FIGS. 5 and 8. Shells 120 are then removed or discharged from the system at station 122.

A further simplified embodiment of a cooking and forming apparatus 218 in accordance with the present invention is illustrated in FIG. 9 of the drawing. In this embodiment, the lower forming means 200 includes a forming body 214 which, as in the previous embodiment, transitions from a generally planar-horizontal configuration, at the end 215, to a generally U-shaped configuration at 216. The U-shaped configuration extends along the remainder of its length. A channel 212 is formed along the middle of body 214 for receiving the upper portion of a narrow conveyor belt 202 that is carried by the sprockets 204, 205, 206, 207 and 208. Belt 202 may be comprised of a continuous body of flexible material or, as illustrated, may be comprised of a plurality of coupled segments 203, which facilitate its bending about the various supporting pulleys. The upper surface 210 of belt 202 is preferrably rounded convex (in section) so as to conform to the ultimate U-shaped taco shell forming configuration illustrated in FIGS. 11 and 12.

The upper forming means 220 includes a forming body 230 which transitions from a horizontally disposed planar configuration, at the end 232, to a generally U-shaped configuration at 234 which extends along the remainder of its length. A channel 228 is formed in the middle of body 230 and extends along the length thereof for receiving the lower portion of a narrow upper conveyor belt 222 that is carried by the sprockets 224 and 226. Belt 22 may likewise be comprised of a continuous body of flexible material or may alternately be comprised of a plurality of coupled segments. The outer surface 221 of belt 222 is preferrably rounded concave (in section) so as to conform to the ultimate U-shaped taco shell forming configuration illustrated in FIG. 11.

The facing surfaces 213 and 231 of bodies 214 and 230 respectively, are smooth but as in the previous embodiment, may be provided with longitudinal grooves or perforations for facilitating lubrication between the surfaces and tortilla 240. Alternately, it will be appreciated that either or both of the bodies 214 and 230 could be comprised of a number of longitudinally disposed rods of small diameter placed close together to provide the forming "surfaces".

In operation, a tortilla 240 placed on conveyor belt 242 is fed onto the upper surfaces of body 214 and belt 202, and is simultaneously engaged at its top surface by belt 222. The frictional engagement between tortilla 240 and the belts 202 and 222 is sufficient to move the partially cooked tortilla rightwardly through the cooking bath and the forming passageway provided between the faces 213 and 231 of bodies 214 and 240 is simultaneously cooked and bowed into the U-shaped configuration illustrated in FIGS. 11 and 12. After emerging from the end 246 of body 230, belt 222 is lifted out of engagement with the now formed and cooked taco shell 250, and taco shell 250 is lifted out of engagement with the lower forming surface 213 by belt 202. In rising over the pulley 207, belt 202 carries taco shell 250 out of the cooking bath and to a packaging station 256.

Note that in this embodiment the need for the articulated web sections of the previous embodiments has been disposed of in favor of fixed forming bodies which provide a forming passageway through which the tortilla is drawn by a pair of narrow conveyor belts. Although this embodiment may require a somewhat greater degree of structural integrity in the initial tortilla in order to prevent it from either rolling or tearing apart, this can be easily accomplished by either increasing the preheating temperature or the period during which the tortilla is subjected to the preheating operation.

In each of the above described embodiments, the belt or cable which either conveys or assists in conveying the tortilla through the cooking bath and out of the apparatus is at all times in intimate contact with the initial tortilla and subsequent taco shell, and thus assures continuous transit thereof through this portion of the system. In cases where slippage might be likely to occur between the tortilla and the conveying means, the belt or cable might be provided with undulations, spurs, or other means for providing positive physical engagement between its surface and that of the tortilla.

In FIG. 13, still another modification of the present invention is illustrated including an upper forming means 400, which may take the form of a web 402 comprised of a belt or chain 404 and articulated segments 406 similar to those illustrated in FIG. 1. In the alternative, forming means 400 may include a belt and forming body such as illustrated at 220 and 222 in FIG. 9. In the present illustration, the web 402 is driven by a pair of sprockets 408 and 410, and the configuration of the lower loop is maintained by a center guide rail 412.

As in FIG. 1, a pair of guides 414 and 416 are provided at each end of web 402 and serve to maintain the flaps of articulated segments 406 in a planar configuration as they pass around sprockets 408 and 410, and then allow them to drop into engagement with a tortilla 12 carried by the lower conveyor unit 420. A pair of flap supporting guides 418 are positioned along each side of the path taken by the upper loop of web 402 as it passes over the top of sprocket 410 for return towards sprocket 408.

The lower forming means 420 includes an articulated conveyor web 422 which is suspended from a pair of sprockets 424 and 426, and a center guide rail 428 upon which the web carrying chain 430 rides. Disposed beneath guide rail 428 is a shallow tank 432 containing cooking oil for providing the final frying of tortillas 12. As in the previous embodiment, a pair of guide members 434 and 436 are disposed at each end of forming means 420 for transitioning the articulated segments from a horizontal disposition, as they pass over sprocket 424, to a U-shaped deformed disposition and then back up to the horizontal disposition as they are passed over sprocket 426. A pair of guide rails 438 are disposed beneath the lower loop of web 422 for supporting the articulated segments as they are returned from sprocket 426 to sprocket 424.

Note that in this embodiment, the tortillas 12 are initially deposited onto web 422 over sprocket 424 and gravity deformed as web 422 is deformed at 442. The deformed tortillas are then carried past a radiant heater unit 440 through the frying tank 432 and then to an unloading station 450 with the articulated segments of web 422 in the deformed position. The fully cooked tortillas are removed at station 450 before the articulated segments of web 422 are transitioned back into their horizontal configuration for passing over sprocket 426.

A center guide rail shown partially at 428 extends from the top of sprocket 424 to the top of sprocket 426. As illustrated, rail 428 is deformed in its midsection to allow web 422 to descent into tank 432. The bends in guide rail 428 are made quite shallow so that the descent and rise of web 422 in to tank 432 is made at approximately 6° so as not to break the formed and cooked tortilla as it is carried over the angular transitions. Alternatively, guide rail 428 could be provided with rather large radius bends.

One of the principle advantages of this embodiment it that the size of tank 432 may be made small since web 422 is returned outside thereof. Accordingly, a savings in the required quantity of cooking oil is obtained.

In FIG. 14, still another modification similar to that shown in FIG. 13 is disclosed in greatly simplified form. In this embodiment, instead of carrying the dry cooked tortillas 12 through a cooking bath, hot cooking oil is pumped up from a collecting pan 500 by a pump 502 to apertured spray devices 504. The devices 504 spray the hot cooking oil over the formed tortillas as they are carried thereunder on web 506. The excess cooking oil is collected by pan 500 reheated by means not shown, and recirculated by pump 502. The spraying operation is further illustrated in the cross section of FIG. 15 which is taken along the line 15—15 of FIG. 14. The upper loop of web 506 is maintained horizontal by a guide rail 508 as it travels from the top of sprocket 510 to the top of sprocket 512.

Among the principle advantages of this modification are that the tortillas 12 are formed over web 506 by gravity, and since they are not carried through a cooking bath, their weight will maintain them in their deformed condition on the forming web 506 as they are carried beneath the dry heater 514 and spray cooking station 516. Thus, no conveyor web is required.

Although the particular apparatus disclosed has been more or less directed toward embodiments specifically suited for forming and cooking taco shells, it is to be understood that the apparatus could also be adapted to form any sheet material into any configuration having one or more longitudinal channels or furrows. As one example, consider the embodiment illustrated in FIG. 13. In this embodiment, instead of forming the upper forming means 600 and lower forming means into a U-shaped cross section, the upper forming means 600 and lower forming means 602 are given a generally corregated configuration. Note that upper forming means 600 is provided with a pair of channels 604 for receiving the upper conveyor belts 606, and lower forming means 602 is provided with a pair of channels 608 for receiving the lower conveyor belts 610.

In this embodiment, a sheet of heat formable work material drawn through the forming passageway, by the conveyor belts 606 and 610, and into the plane of the drawing, will result in the formation of a corregated member 612. Thus, the present invention is clearly not limited to the formation of folded-over, or U-shaped comestible articles, but may be used to form any number of heat formable articles. Note also that because of the nature of the forming apparatus, a continuous strip of heat formable material could even be passed through the system.

After having read the above disclosure of the preferred embodiment, it is contemplated that many additional alterations and modifications of the invention will no doubt become apparent to those of ordinary skill in the art. Accordingly, it is intended that the appended claims be interpreted as covering all alterations and modifications which fall within the true spirit and scope of the invention.

What is claimed is:

1. Food preparation apparatus for cooking and forming a sheet of comestible material, comprising:
   conveying means including, a first endless belt disposed to engage one side of the material and move it from a first position past a second position to a third position, a second endless belt disposed to engage the opposite side of the material to assist said first belt in moving the material from said first position to said second position, and means for driving said first and second belts in synchronism;
   forming means for engaging the material and deforming it into a predetermined non-flat configuration while it is being moved from said first position to said second position, said forming means includes a first forming body having an upper surface extending from said first position to said second position, said upper surface being generally flat near said first position and transitioning to a predetermined non-flat configuration at a point intermediate said first and second positons; and
   heating means for heating the material while it is being moved from said first position to said second position.

2. Food preparation apparatus as recited in claim 1 wherein said forming means further includes a second forming body having a lower surface extending from said first position to said second position, said lower surface being generally flat near said first position and transitioning to a non-flat configuration at a point intermediate said first and second positions, said first and second surfaces being disposed in spaced apart facing relationship and defining a forming passageway through which the material is moved by said conveying means.

3. Food preparation apparatus as recited in claim 1 wherein said forming means further includes a plurality of articulated segments carried by said second belt, said segments being operative to engage said opposite sides of the material to deform it over said upper surface as it is moved from said first position to said second position.

4. Food preparation apparatus for cooking and forming a sheet of comestible material, comprising:
   conveying means for continuously moving the material along a path from a first position to a second position;
   forming means disposed between said first and second positions and operative to deform the material as it is moved along said path;
   heating means disposed between said first and second positions and operative to heat the material as it is moved along said path; and
   an endless belt having a portion disposed along said path and between the forming means and the material, said belt being moved in synchronism with said conveying means and being operative to remove the deformed material from the conveying means at said second position and to transport the deformed material to a third position.

5. Food preparation apparatus as recited in claim 4 wherein said forming means includes a body extending from said first position to said second position and having a surface transitionally deformed from a generally flat configuration at said first position to a predetermined non-flat configuration at a point intermediate said first and second positions, said conveying means including means for causing the material to be deformed over said surface as it is moved along said path.

6. Food preparation apparatus as recited in claim 4 wherein said forming means includes, an upper body having a first forming surface, and a lower body having a second forming surface disposed in spaced apart facing relationship with said first surface, said first and second surfaces being transitionally deformed from a first configuration at said first position in to a second configuration at a point inbetween said first and second positions, the space between said first and second surfaces forming a deforming passageway through which the material is moved by said conveying means.

7. Food preparation apparatus as recited in claim 6 wherein said conveying means includes another endless belt disposed to frictionally engage the upper surface of the material while said first mentioned endless belt frictionally engages the lower surface of the material.

8. Food preparation apparatus as recited in claim 7 wherein said lower body forms a first channel extending along said path for receiving said first mentioned endless belt and said upper body forms a second channel extending along said path for receiving said another endless belt.

* * * * *